July 10, 1945.  H. R. SCOTT  2,380,193
HARVESTING MACHINE
Filed Oct. 21, 1943  5 Sheets-Sheet 2
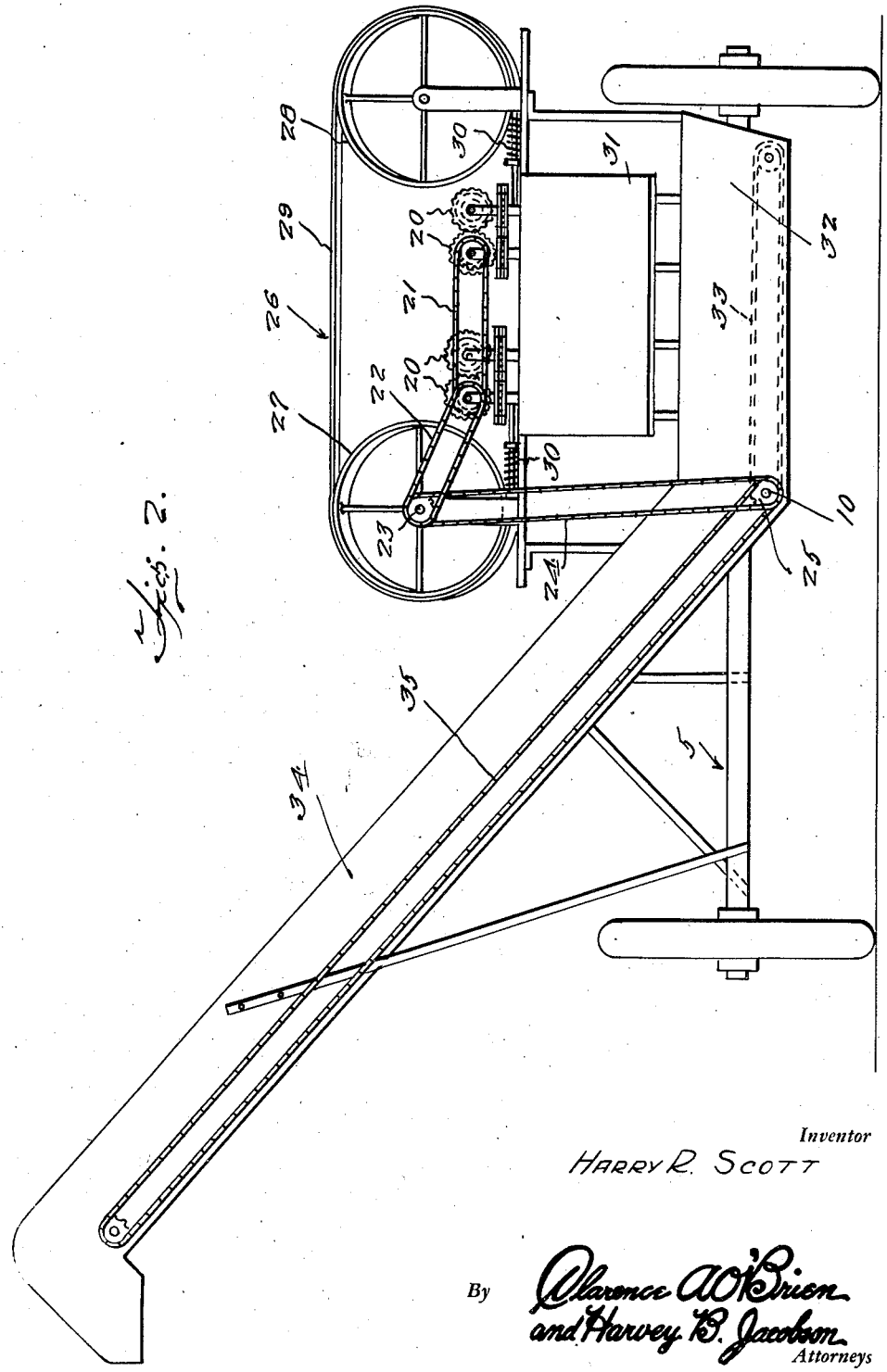
Inventor
HARRY R. SCOTT
By Clarence A. O'Brien
and Harvey B. Jacobson
Attorneys

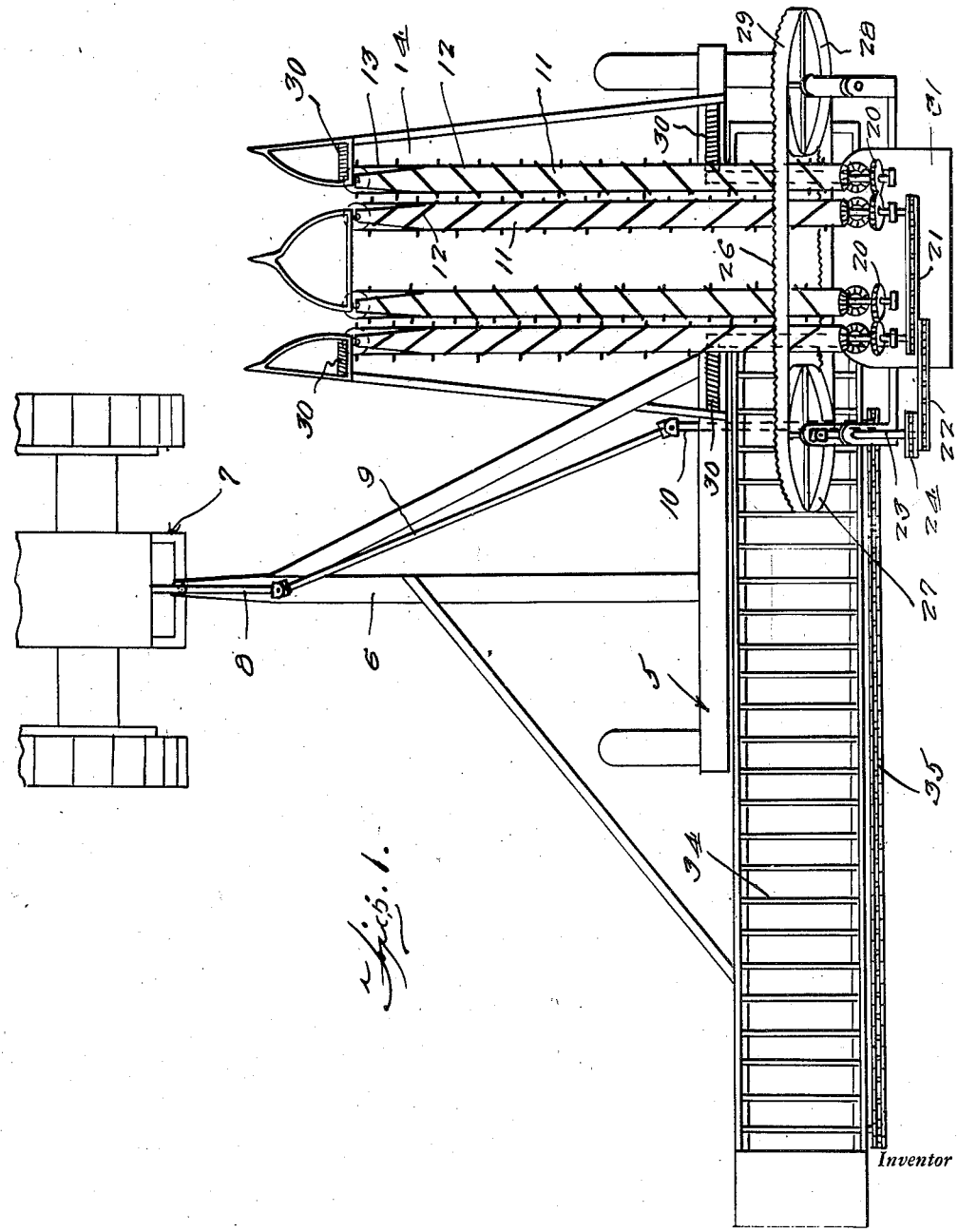

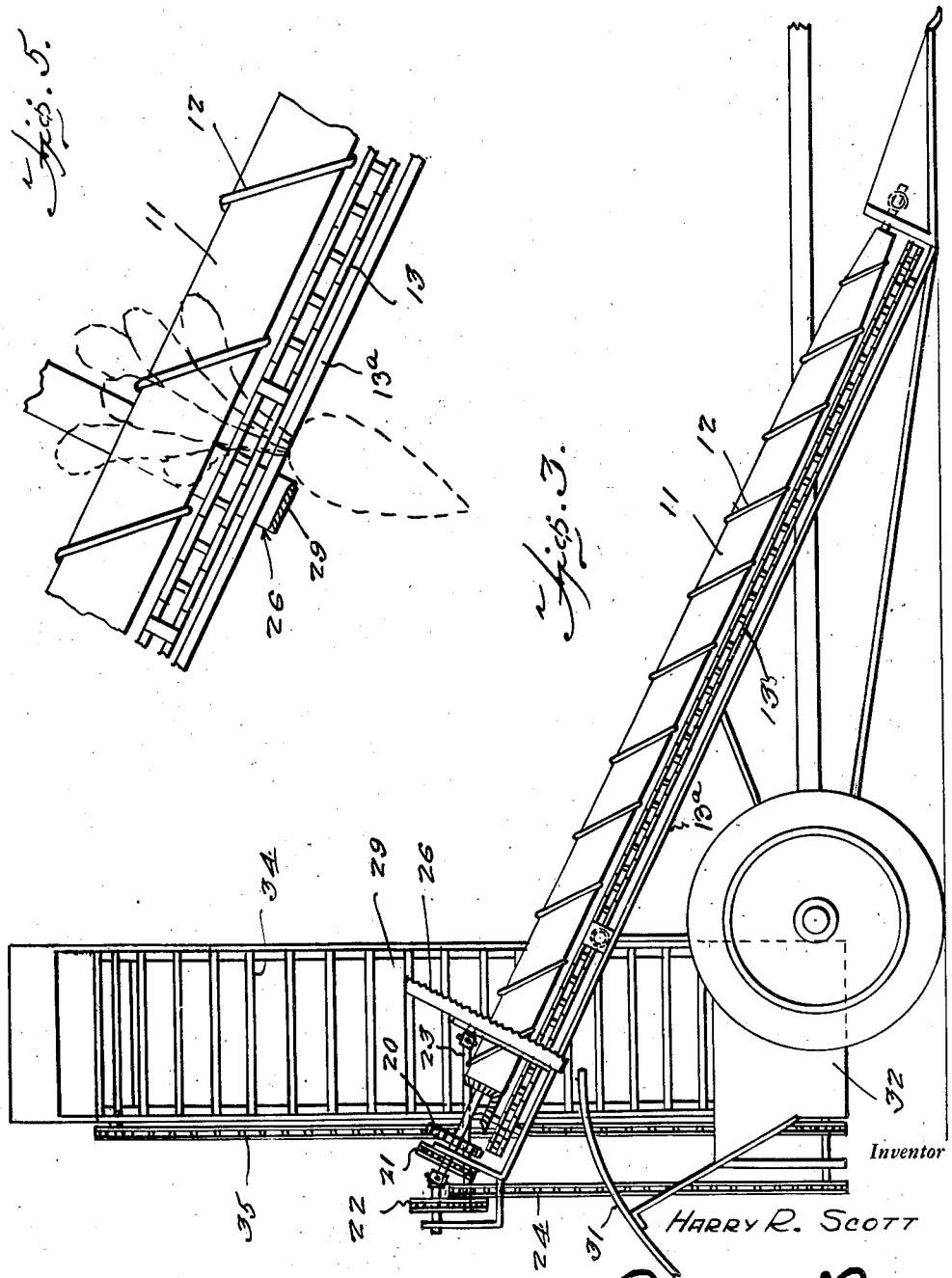

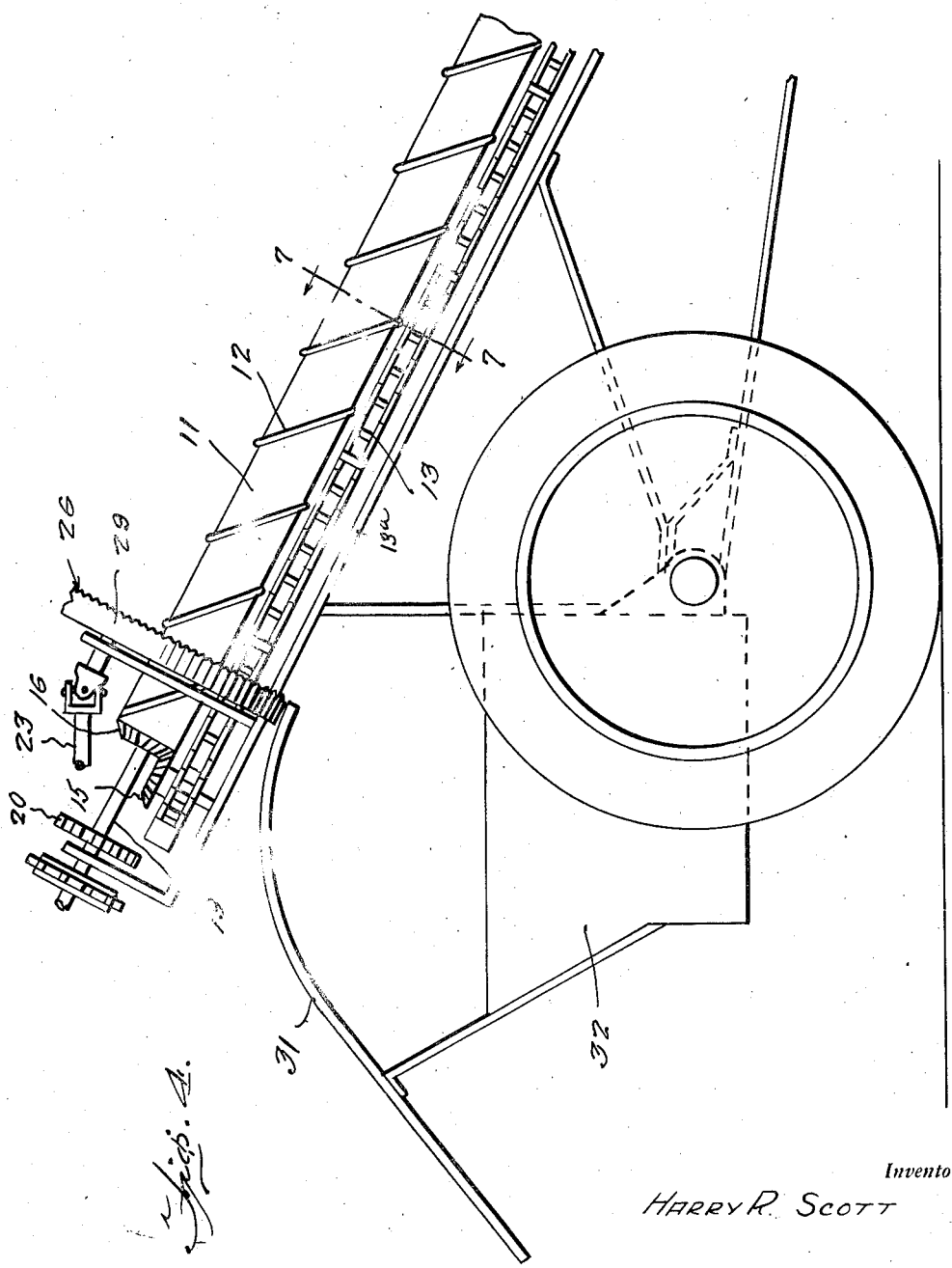

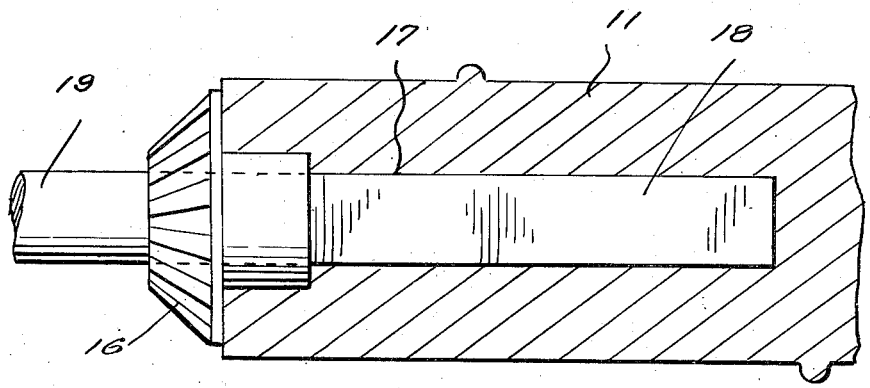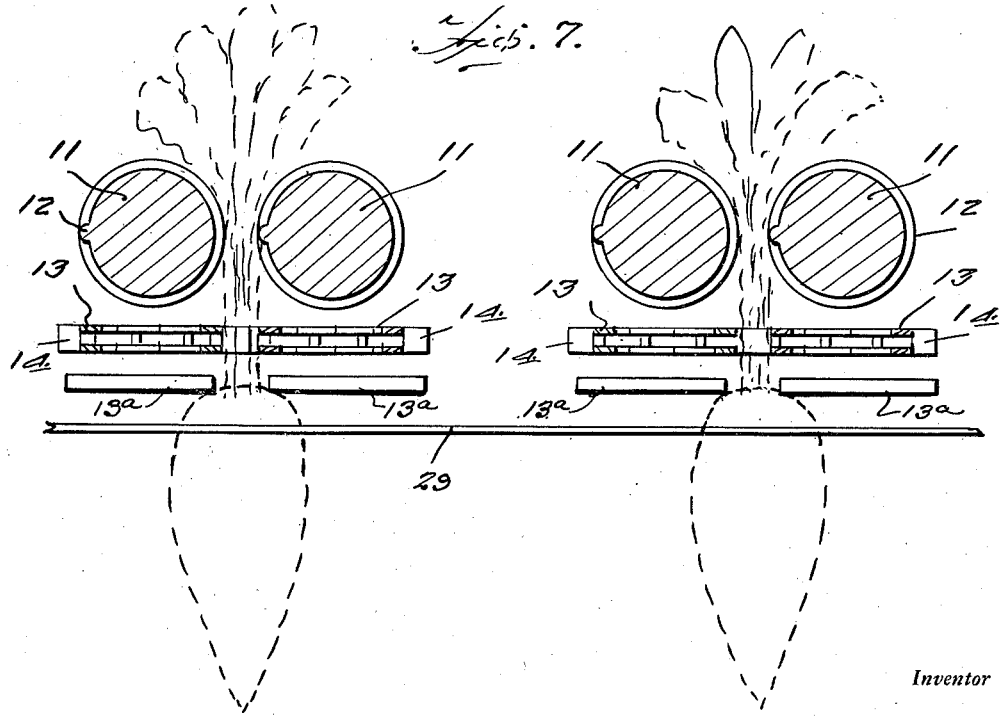

Patented July 10, 1945

2,380,193

UNITED STATES PATENT OFFICE 2,380,193

HARVESTING MACHINE

Harry R. Scott, King City, Calif.

Application October 21, 1943, Serial No. 507,143

4 Claims. (Cl. 146—85)

This invention relates to new and useful improvements in harvesting machines for root crops such as sugar beets, the principal object being to provide means for elevating the sugar beets by their tops and thus holding the beets in a definite position while they are topped.

Another important object of the invention is to provide a harvesting machine for root crops such as sugar beets, wherein a cutter is employed in conjunction with a guide structure, along with elevating means, the elevating means serving to hold the roots with their crowns riding the guide structure, to the end that a definite portion of the crown with the beet top will be removed at the cutting operation.

Another important object of the invention is to provide topping means for root crop harvesters, wherein a band saw is employed for separating the roots from their tops.

Other objects and advantages of the invention will become apparent to the reader of the following description.

In the drawings:

Figure 1 represents a top plan view of the harvester.

Figure 2 is a rear elevational view.

Figure 3 is a side elevational view.

Figure 4 is a fragmentary enlarged side elevational view.

Figure 5 is a fragmentary side elevational view showing how the beets are elevated.

Figure 6 is a fragmentary sectional view showing the upper end of one of the rolls.

Figure 7 is a cross sectional view taken substantially on the line 7—7 of Figure 4.

Referring to the drawings wherein like numerals designate like parts, it can be seen that numeral 5 denotes a frame equipped with a drawbar or tongue 6 attached to a tractor generally referred to by numeral 7, this type of tractor having a power take-off 8 which is connected to a shaft 9, which, in turn, is connected to a shaft 10 on the harvester. This shaft can be clearly seen in Figures 1 and 2. The shaft 10 drives all of the moving parts of the harvester.

The harvester further has a pair of rolls 11, 11 to take care of each of a pair of rows, the rolls of each pair being in close spaced relation as shown in Figure 7 and each roller has a spiral rib 12 extending longitudinally thereon. Just under each roll 11 is an endless chain 13 having lugs 14 thereon which serve to push the beets as they are carried upwardly by the ribs on the rolls 11, as is clearly shown in Figure 5. It will be observed that the beets are lifted by their tops, the roots thereof being held with their crowns riding guide rails 13a.

Sprockets at the upper ends of the chains 13 have bevel gears 15 which mesh with bevel gears 16 on the corresponding ends of the rolls 11. The upper ends of the rolls 11 have squared recesses 17 for receiving the squared ends 18 of shafts 19, which shafts 19 have gears 20 which mesh with each other as is clearly shown in Figure 1. One shaft 19 of each pair of rolls 11 has an extension and these extensions are equipped with sprocket wheels over which a sprocket chain 21 is trained and one of these extended shafts has an additional sprocket over which a sprocket chain 22 is trained from a sprocket wheel on a shaft 23, which also has a sprocket wheel over which a sprocket chain 24 is trained and also trained over a sprocket wheel 25 on the drive shaft 10.

Numeral 26 denotes a band saw type of cutter, the same consisting of a pair of wheels 27, 28 over which the band cutter 29 is trained. The wheel 27 is located on the aforementioned shaft 23.

It is preferable that the outside rolls 11 be provided with tensioning means 30 at the upper and lower ends thereof so as to firmly hold the beet tops as they are being lifted to the cutter 26.

At the upper end of the rolls, an apron 31 is provided for delivering the tops to the rear of the machine while the beets fall into a trough 32 and are carried by a horizontal conveyor 33 to an inclined conveyor 34, the latter being driven by a chain 35 from the shaft 10.

As is apparent in Figure 4, and again in Figure 5, the rolls 11 serve to hold the beets by their tops with the roots depending. The rolls have sufficient lifting effect to always maintain the crowns of the beet roots against the guide rail 13a, as the beets are pushed upwardly by the pusher chains 13. Obviously, when the beets reach the cutting band 29, the band will separate the roots from the tops, always taking an equal cut off at the crowns, regardless of the size of the beet root.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A harvester of the character described comprising crop elevating means, a feeding device for carrying the elevated crop and an endless cutting device operating transversely of the elevating means and adapted for topping the crop as it is elevated and fed to said cutting device, said endless cutter being in the form of a band saw and common drive means for the band saw, and said elevating means.

2. A harvester of the character described comprising crop elevating means and an endless cutting device operating transversely of the elevating means and adapted for topping the crop as it is elevated, said endless cutter being in the form of a band saw and drive means for the band saw, said elevating means being in the form of a pair of parallelly spaced rolls each with a coarse pitched helical rib for holding the tops and endless pusher means for feeding to the band saw the articles to be topped, said pusher means running parallelly beneath said rolls.

3. A harvester for harvesting root crops as described in claim 2, having a guide bar against which the roots ride as they are elevated, said cutter predeterminedly spaced with respect to the guide bar for separating the roots from their tops.

4. A harvester as described in claim 2 in which said endless pusher means consists of parallel running chains provided with mating lugs for gripping said tops, and being substantially of the same length as said rolls.

HARRY R. SCOTT.